(12) United States Patent
    Shen

(10) Patent No.: US 10,813,179 B2
(45) Date of Patent: Oct. 20, 2020

(54) CONTROLLER BASED ON APP CONTROL AND POWER PLUG

(71) Applicant: NINGBO GOLDEN POWER ELECTRONIC CO.,LTD., Ningbo (CN)

(72) Inventor: Zhengxian Shen, Ningbo (CN)

( * ) Notice: Subject to any disclaimer, the term of this patent is extended or adjusted under 35 U.S.C. 154(b) by 0 days.

(21) Appl. No.: 16/241,253

(22) Filed: Jan. 7, 2019

(65) Prior Publication Data

US 2019/0215923 A1    Jul. 11, 2019

(30) Foreign Application Priority Data

Jan. 10, 2018  (CN) .................... 2018 2 0035319 U

(51) Int. Cl.
| | | |
|---|---|---|
| H05B 45/00 | (2020.01) | |
| H05B 39/04 | (2006.01) | |
| H05B 45/37 | (2020.01) | |
| H05B 47/19 | (2020.01) | |
| F21V 23/06 | (2006.01) | |
| F21S 4/28 | (2016.01) | |

(52) U.S. Cl.
CPC .............. *H05B 45/00* (2020.01); *F21S 4/28* (2016.01); *F21V 23/06* (2013.01); *H05B 39/044* (2013.01); *H05B 45/37* (2020.01); *H05B 47/19* (2020.01)

(58) Field of Classification Search
None
See application file for complete search history.

(56) References Cited

U.S. PATENT DOCUMENTS

| | | | | |
|---|---|---|---|---|
| 2007/0132315 | A1* | 6/2007 | Wang .................... | G06F 1/26 307/18 |
| 2012/0049765 | A1* | 3/2012 | Lu ....................... | F21S 6/001 315/312 |
| 2012/0306435 | A1* | 12/2012 | Tu ........................ | H02J 7/00 320/107 |
| 2018/0139824 | A1* | 5/2018 | Lin ....................... | F21S 4/10 |

* cited by examiner

*Primary Examiner* — Crystal L Hammond
(74) *Attorney, Agent, or Firm* — W&K IP

(57) ABSTRACT

The present disclosure discloses a controller based on APP control, disposed between a power source and a lamp strip. The controller comprises: a receiving control unit electrically connected to the power source for receiving a Bluetooth signal or a WIFI signal transmitted by an external smart terminal, and issuing a control signal according to the Bluetooth signal or the WIFI signal; a driving unit electrically connected to the receiving control unit for adjusting a flicker color and a flicker frequency of the lamp strip according to the control signal; and a manual control unit electrically connected to the receiving control unit for inputting a manual signal to the receiving control unit to cause the driving unit to switch the lamp strip to different modes.

10 Claims, 5 Drawing Sheets

CONTROLLER BASED ON APP CONTROL AND POWER PLUG

CROSS-REFERENCE TO RELATED APPLICATIONS

This application claims priority to Chinese Patent Application No. 201820035319.1 with a filing date of Jan. 10, 2018. The content of the aforementioned application, including any intervening amendments thereto, are incorporated herein by reference.

TECHNICAL FIELD

The present disclosure relates to the field of controllers and more particularly to a controller based on APP control and a power plug.

BACKGROUND

In recent years, lighting equipment for LED light sources has been greatly developed. Correspondingly, there are more and more controllers for LED strips. However, in present applications, it is still a problem for the user to remotely manipulate a controller to change the illumination provided by the LED strip. Therefore, providing a controller based on APP control is one of the urgent problems to be solved.

SUMMARY

The technical solution of the present disclosure relates to a controller based on APP control, disposed between a power source and a lamp strip. The controller comprises: a receiving control unit electrically connected to the power source for receiving a Bluetooth signal or a WIFI signal transmitted by an external smart terminal, and issuing a control signal according to the Bluetooth signal or the WIFI signal; a driving unit electrically connected to the receiving control unit for adjusting a flicker color and a flicker frequency of the lamp strip according to the control signal; and a manual control unit electrically connected to the receiving control unit for inputting a manual signal to the receiving control unit to cause the driving unit to switch the lamp strip to different modes.

In one embodiment, the driving unit is a MOS transistor Q1. A gate of the MOS transistor Q1 is electrically connected to an output end of the receiving control unit. A source of the MOS transistor Q1 is connected to the gate via a resistor R15. A drain of the MOS transistor Q1 is grounded through a resistor R16. The lamp strip LED1 is connected in parallel with the resistor R16. A transistor Q2 is further disposed between the gate of the MOS transistor Q1 and the output end of the receiving control unit. The gate of the MOS transistor Q1 and the collector of the transistor Q2 are electrically connected. The emitter is grounded, and a base is electrically connected to the receiving control unit.

In one embodiment, the receiving control unit is a Bluetooth control chip. Both a first pin and a second pin of the Bluetooth control chip are electrically connected with the power source, and a third pin and a fourth pin of the Bluetooth control chip are electrically connected to the driving unit as respective signal output pins.

In one embodiment, the receiving control unit is a Bluetooth or WIFI chip.

In one embodiment, the manual control unit comprises a button SW1. One end of the button SW1 is connected to the receiving control unit at a manual signal input pin, and the other end of the button SW1 is grounded.

In one embodiment, a fifth pin of the Bluetooth control chip is further connected to an output terminal of the power source through a serially connected resistor R14 and a light emitting diode LED.

The technical solution of the present disclosure further relates to a power plug having the controller, a housing, and a power processing unit disposed inside the housing. The controller is arranged inside the housing, and the power processing unit is electrically coupled to the controller. In one embodiment, the power plug comprises a rectifier circuit connected to the power source for rectifying the power source; a voltage conversion circuit electrically connected to the rectifier circuit for converting alternating current outputted by the rectifier circuit into direct current; and a voltage stabilizing circuit disposed between the voltage conversion circuit and the first and second pins of the Bluetooth control chip of the controller for performing voltage stabilization processing on the input voltage of the Bluetooth control chip.

The above technical solution has the following advantages or beneficial effects: Through the above controller, the user can control the controller through the smart terminal by installing the corresponding APP software in the smart terminal, and then connecting the controller to adjust the working mode of the lamp strip and set the timing. The power plug combines the power processing unit and the controller, and can be directly plugged in a socket to enables powering of the LED lights and controlling of the LED strip.

BRIEF DESCRIPTION OF THE DRAWINGS

Embodiments of the present disclosure are described more fully with reference to the accompanying drawings. The drawings are, however, to be construed as illustrative and not restriction.

Figure 1:
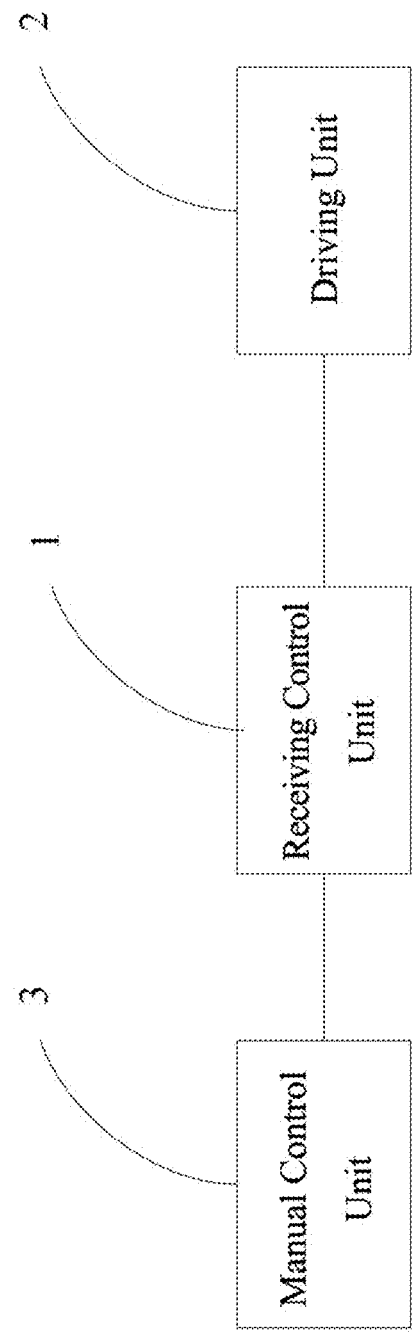
FIG. 1 is a structural block diagram of a power plug based on APP control according to an embodiment of the present disclosure.

In the drawings: 1, receiving control unit; 2, driving unit; 3, manual control unit; 4, power processing unit; 21, housing; 22, controller.

DETAILED DESCRIPTION

The controller based on APP control and the power plug of the present disclosure will be described in detail below with reference to the accompanying drawings and exemplary embodiments.

As shown in FIG. 1, a controller based on APP control disposed between a power source and a lamp strip comprises a receiving control unit 1 electrically connected to the power source for receiving a Bluetooth signal or a WIFI signal transmitted by an external smart terminal, and issuing a control signal according to the Bluetooth signal or the WIFI signal, a driving unit 2 electrically connected to the receiving control unit 1 for adjusting a flicker color and a flicker frequency of the lamp strip according to the control signal, and a manual control unit 3 electrically connected to the receiving control unit 1 for inputting a manual signal to the receiving control unit to cause the driving unit 2 to switch the lamp strip to different modes.

Specifically, in the above-mentioned APP-based controller, when the receiving control unit 1 receives a Bluetooth signal or a WIFI signal transmitted by an external smart terminal the Bluetooth signal or the WIFI signal is processed, and a control signal is output to the driving unit 2. The driving unit 2 adjusts parameters according to the magnitude and frequency of the output voltage of the control signal, thereby adjusting the flicker color and the flicker frequency of the lamp strip. It is worth noting that a manual control unit 3 is also provided in the controller, and the manual control unit 3 is electrically connected to the receiving control unit 1. The user can also input a manual signal to the receiving control unit 1 through the manual control unit 3. The receiving control unit 1 inputs a corresponding control signal to the driving unit 2 according to the manual signal, and it may also change the magnitude and frequency of the output voltage for the driving unit 2, thereby adjusting the flicker color and the flicker frequency of the lamp strip.

Figure 2:
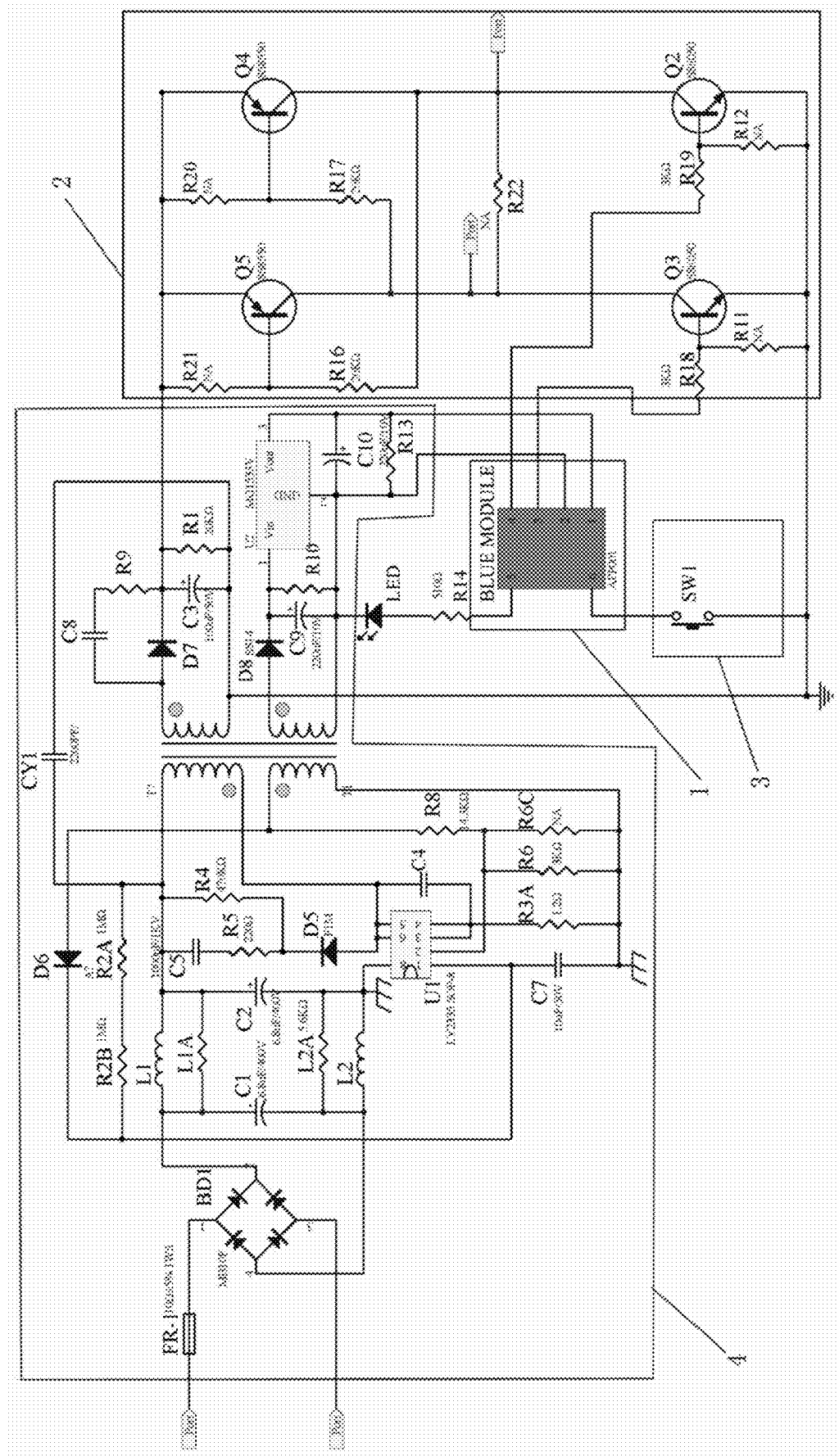
FIG. 2 is a first circuit diagram of a power plug based on APP control according to the present disclosure.
Figure 3:
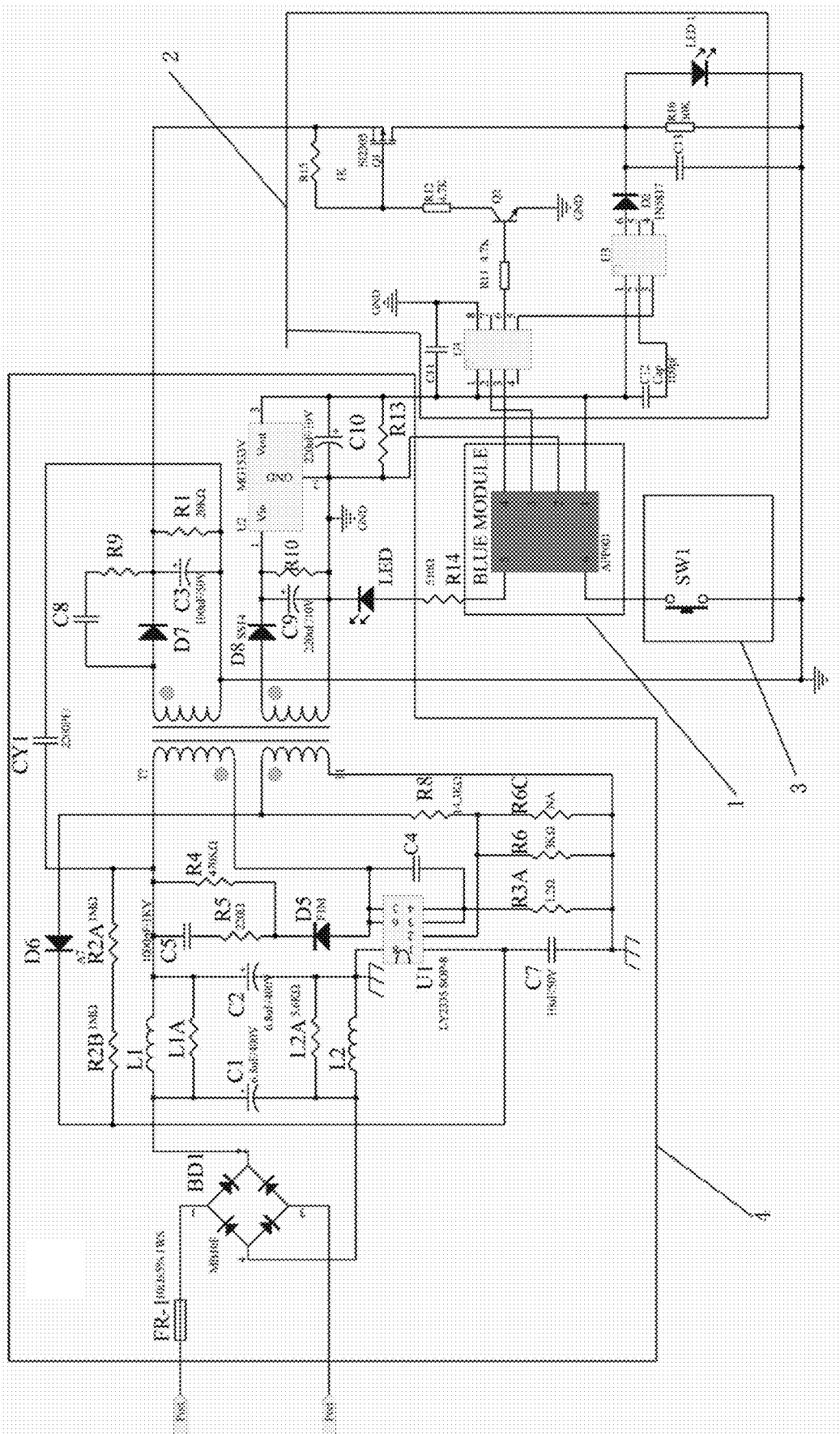
FIG. 3 is a second circuit diagram of a power plug based on APP control according to the present disclosure.
Figure 4:
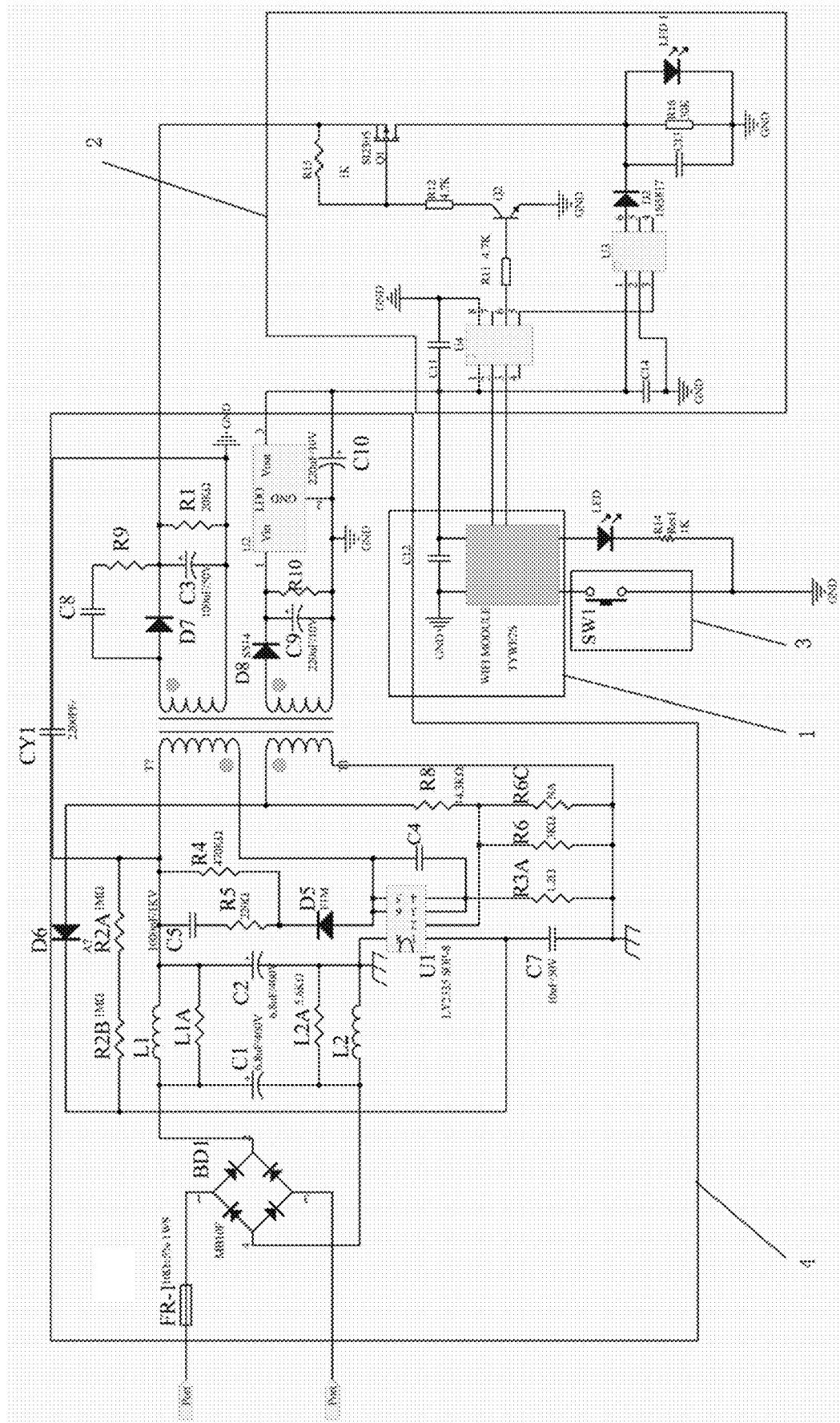
FIG. 4 is a third circuit diagram of a power plug based on APP control according to the present disclosure.

Further step, as shown in FIG. 2 and FIG. 3, the receiving control unit 1 is a Bluetooth control chip BLUE MODULE, and the first pin and the second pin of the Bluetooth control chip are electrically connected to the power source, and the third pin and the fourth pin are electrically connected to the driving unit 2 as signal output pins to output a control signal to the driving unit 2. The model of the Bluetooth control chip is for example the TLSR8266F512ET32 model of Tailing. In addition, as shown in FIG. 4, the above-mentioned receiving control unit 1 may also be a WIFI chip, and its model number may be TYWE2S.

Further, the fifth pin of the Bluetooth control chip is also connected to the power supply terminal through a serially connected resistor R14 and an LED, to detect whether the Bluetooth control chip is successfully communicating with the smart terminal and whether the timing function is enabled. Correspondingly, the WIFI chip can also be electrically connected to the serially connected resistor R14 and the LED, to detect whether the WIFI chip is successfully communicating with the smart terminal and whether the timing function is enabled.

Further, the receiving control unit 1 integrates Bluetooth and control functions into one single body, which can receive Bluetooth or WIFI signals, and may also process Bluetooth or WIFI signals and send control signals.

Further, the manual control unit 3 includes a button SW1. When the receiving control unit 1 is a Bluetooth control chip, one end of the button SW1 is connected to the sixth pin (manual signal input pin) of the Bluetooth control chip, and the other end is grounded. When the user presses the button SW1, each press would input a control signal, and the Bluetooth control chip is controlled to change the voltage output from the third pin and the fourth pin, thereby realizing the adjustment of the lamp strip, i.e., the switching of different modes. In addition, at the fifth pin of the Bluetooth control chip, an LED and a resistor R14 are connected to the power supply. When the controller enters the timing mode, the LED is illuminated to remind the user.

Further, as shown in FIG. 2, the driving unit 2 is composed of a plurality of transistors, and each transistor may be a triode or a MOS transistor. Preferred are four transistors Q5, Q4, Q3, Q2. The third pin and the fourth pin of the Bluetooth control chip are respectively connected to the base or the gate of the third triode or MOS transistor and the second triode or MOS transistor. The emitters or the sources of both pins are grounded. The collectors or the drains of the both pins are connected to the lamp strip as an output terminal. When the third pin and the fourth pin output a control signal, the magnitude and the frequency of the output voltage of the second triode or MOS transistor and the third triode or MOS transistor are changed, thereby adjusting the flicker color and the flicker frequency of the lamp strip. It is worth noting that the emitters of the fifth triode or MOS transistor and the fourth triode or MOS transistor are both connected at the output end of the power supply, and the bases of the fifth triode or MOS transistor are connected to the collectors or the drains of the second triode or MOS transistor and the fourth triode or MOS transistor through a resistor R16. The bases of the fourth triode or MOS transistor are then connected to the collectors or drains of the third triode or MOS transistor and the fifth triode or MOS transistor through a resistor R17. In addition, the bases or gates of the third triode or MOS transistor are grounded via a resistor R11, and the bases or gates of the second transistor triode or MOS transistor are grounded via a resistor R12. A resistor R18 is connected in series between the third pin of the Bluetooth control chip and the base or gate of the third triode or MOS transistor, and a resistor R19 is connected in series between the fourth pin and the gates or the bases of the second triode or MOS transistor.

Further, as shown in FIGS. 3 and 4, the driving unit 2 is a MOS transistor Q1, the gate of the MOS transistor Q1 is electrically connected to the output terminal of the receiving control unit 1, the source is connected to the gate via a resistor R15, and the drain is grounded via a resistor R16. The lamp strip with LED is connected in parallel with R16. It is worth noting that a transistor Q2 is further disposed between the gate of the MOS transistor Q1 and the output terminal of the receiving control unit 1, that is, the gate of the MOS transistor Q1 is electrically connected to the collector of the transistor Q2, and the emitter of the Q2 is grounded. The base stage is electrically connected to the receiving control unit 1. The deployment of the transistor Q2 can amplify the control signal outputted by the receiving control unit 1 to ensure the precision of the signal received by the subsequent MOS transistor Q1. Further, a resistor R12 is provided between the collector of the transistor Q2 and the gate of the MOS transistor Q1, and a voltage stabilizing chip U4 is provided between the base of the transistor Q2 and the receiving control unit 1. Besides, the output end of the power processing unit 4 is connected to the lamp strip via a voltage stabilizing chip U3.

In the above controller, as shown in FIG. 2, when the serially connected lamp strips are a pair of reverse strips, the controller controls the lamp strip to switch between eight modes which include an automatic cycle, a wave advancement, a double-lamp round trip, single lamp fade-out, flicker round trip, all-lamp flicker, blinking lamp and full illumination. When the lamp strip is a stepless lamp strip, the controller controls the lamp strip to realize switch between eight modes which include an automatic cycle, a forward illumination, a backward it lumination, a forward flicker, a backward flicker, an alternate flicker, breath, forward fade-out and backward fade-out. It is worth pointing out that when the illumination intensity of the lamp strip is gradually lowered and repeated repeatedly at a certain period or frequency, a breathing effect of the lamp strip is achieved. In addition, when the light strip is illuminated, one or more of the LED lights may suddenly increase in illumination intensity (significantly higher than other LED lights) to enter a jumper pattern. The jumper pattern can appear at a certain frequency. In the above controller as shown in FIG. 3 and FIG. 4, display of seven monochrome modes and eight multi-color modes in the lamp strip can also be realized. Among them, the monochrome modes include: normal illumination, fade-in, fade-out, blinking, blossom, round trip, fireworks, meteors and flowing, Each of the monochrome modes corresponds to one color, and the seven colors are red, orange (yellow-green), green, blue (blue-green), blue, purple (red-blue), and white (red, green, and blue). The eight modes of color are: six-color jump, six-color gradient, six-color random blinking, RGB blinking, six-color round trip, six-color flicker, rainbow meters and colored band.

In addition, the above controller can also control the lamp strip to follow music for brightness and frequency adjustment. During music playback, the controller adjusts the brightness and frequency of the lamp strip according to the sound level of the music, so as to achieve the effect of the brightness of the light strip and the frequency of the change with the music.

In addition, the above controllers can be divided into two models which may include a memory or not. The first mode is default after power-on. A short press on the button SW1 can switch between the eight function modes (or nine function modes). For example, after power-on, the first mode is enabled, then the user may press the button for the second mode, or press again for the third mode, and so on. Pressing again at the eighth mode returns the lamp strip to the first mode. If it is a stepless lamp strip, pressing again at the eighth mode returns the lamp strip to the first mode. The user can also install corresponding APP software in the smart terminal, connect the controller, and then control the controller through the smart terminal to adjust the working mode of the light strip and set the timing time. In addition, if the LED does not flash after power-on, it indicates that a smart terminal is already connected with the controller. If the LED is kept on, the timing function would also be turned on, and a flashing LED indicates that no smart terminal is connected to the controller. In addition, after the button SW1 is pressed and held for a certain period of time (preferably 8 s), the controller will be reset. The connection with the previous smart terminal is disconnected, and then the LED would be blinking. The above smart terminals are all smart terminals with Bluetooth functionalities.

Figure 5:
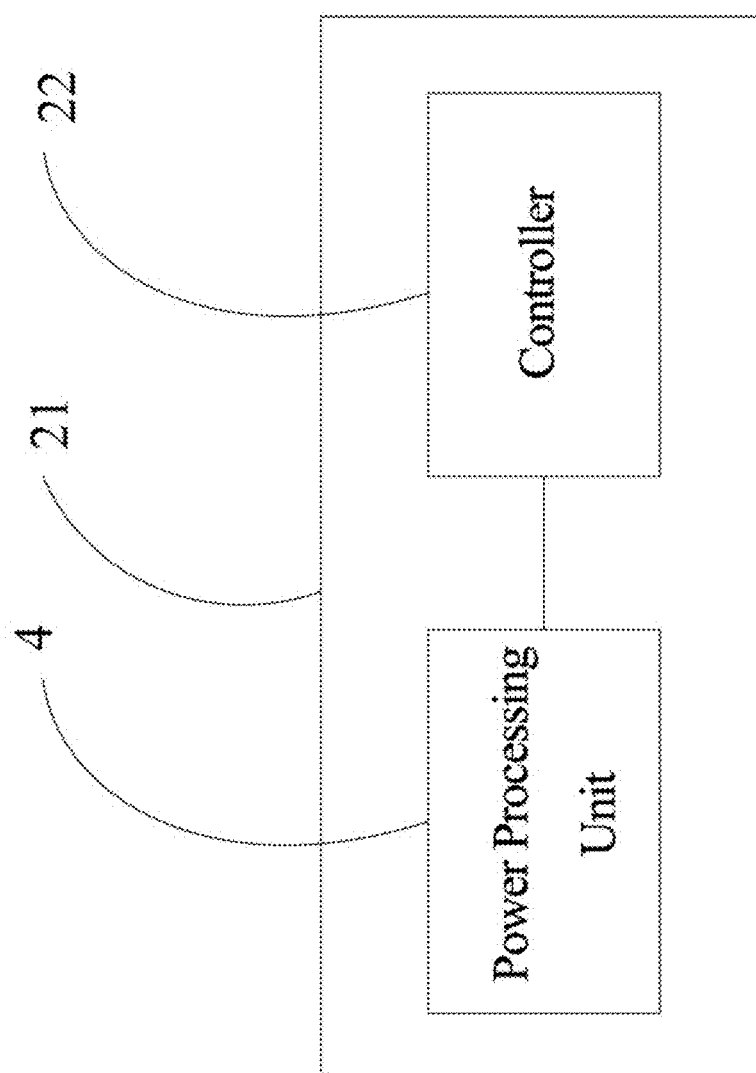
FIG. 5 is a structural block diagram of a power plug according to an embodiment of the present disclosure.

In addition, as shown in FIG. 5, the present disclosure also provides a power plug including a housing, the above-mentioned controller disposed in the housing, and a power processing unit 4 electrically connected to the controller. The power processing unit 4 is disposed between the controller and the power supply so that the power supply voltage is processed before it is input to the controller.

The power processing unit 4 includes a rectifier circuit connected to the power source for rectifying the power source, a voltage conversion circuit electrically connected to the rectifier circuit for converting alternating current outputted by the rectifier circuit into direct current, and a voltage stabilizing circuit disposed between the voltage conversion circuit and the first and second pins of the Bluetooth control chip of the controller for performing voltage stabilization processing on the input voltage of the Bluetooth control chip.

The voltage stabilizing circuit is composed of a voltage stabilizing U2 which is for example MG1533V.

The stability of the voltage input into the controller is ensured by the power processing unit 4 described above. The power plug combines the power processing unit 4 and the controller. They can be directly plugged into a socket to enable power supply for the LED lamp and control of the LED strip.

Various changes and modifications will no doubt become apparent to those skilled in the art upon reading embodiments of the present disclosure. Accordingly, the appended claims are intended to cover all such changes and modifications. The scope and content of any and all equivalents are intended to be within the scope and principle of the disclosure.

I claim:

1. A controller based on APP control, disposed between a power source and a lamp strip, wherein the controller comprises:
   a receiving control unit electrically connected to the power source for receiving a Bluetooth signal or a WIFI signal transmitted by an external smart terminal, and issuing a control signal according to the Bluetooth signal or the WIFI signal;
   a driving unit electrically connected to the receiving control unit for adjusting a flicker color and a flicker frequency of the lamp strip according to the control signal;
   a manual control unit electrically connected to the receiving control unit for inputting a manual signal to the receiving control unit to cause the driving unit to switch the lamp strip to different modes;
   the driving unit is composed of a second transistor, a third transistor, a fourth transistor, and a fifth transistor;
   output pins for two output control signals of the receiving control unit are respectively connected to a base or a gate of the second transistor and the third transistor;
   an emitter or a source of the second transistor and the third transistor are grounded and a collector or a drain is connected as an output terminal to the lamp strip;
   the emitters or sources of the fourth transistor and the fifth transistor are connected to the power source;
   a base of the fifth transistor is connected to a collector or a drain of the fourth transistor and the second transistor; and
   a base of the fourth transistor is connected to a collector or a drain of the third transistor and the fifth transistor.

2. The controller according to claim 1, wherein
   the driving unit is a MOS transistor Q1,
   a gate of the MOS transistor Q1 is electrically connected to an output end of the receiving control unit,
   a source of the MOS transistor Q1 is connected to the gate via a resistor R15,
   a drain of the MOS transistor Q1 is grounded through a resistor R16,
   the lamp strip LED1 is connected in parallel with the resistor R16,
   a transistor Q2 is further disposed between the gate of the MOS transistor Q1 and the output end of the receiving control unit,
   the gate of the MOS transistor Q1 and the collector of the transistor Q2 are electrically connected, and
   the emitter is grounded.

3. The controller according to claim 2, wherein the receiving control unit is a Bluetooth control chip,
   both a first pin and a second pin of the Bluetooth control chip are electrically connected with the power source, and
   a third pin and a fourth pin of the Bluetooth control chip are electrically connected to the driving unit as respective signal output pins.

4. The controller according to claim 3, wherein the manual control unit comprises a button SW1,
   one end of the button SW1 is connected to the receiving control unit at a manual signal input pin, and
   the other end of the button SW1 is grounded.

5. The controller according to claim 3, wherein a fifth pin of the Bluetooth control chip is further connected to an output terminal of the power source through a serially connected resistor R14 and a light emitting diode LED.

6. The controller according to claim 3, wherein the different modes comprise a first mode in which the illumination intensity of the lamp strip repeatedly lowers at a predetermined period and a second mode in which the illumination intensity of one or more LED of the lamp strip is raised higher than the rest of the lamp strip.

7. The controller according to claim 2, wherein the receiving control unit is a WIFI chip.

8. The controller according to claim 7, wherein the manual control unit comprises a button SW1,
- one end of the button SW1 is connected to the receiving control unit at a manual signal input pin, and
- the other end of the button SW1 is grounded.

9. A power plug comprising the controller according to claim 1, a housing, and a power processing unit disposed inside the housing, wherein the controller is arranged inside the housing, and the power processing unit is electrically coupled to the controller.

10. The power plug according to claim 9, wherein the power processing unit comprises:
- a rectifier circuit connected to the power source for rectifying the power source;
- a voltage conversion circuit electrically connected to the rectifier circuit for converting alternating current outputted by the rectifier circuit into direct current; and
- a voltage stabilizing circuit disposed between the voltage conversion circuit and the first and second pins of the Bluetooth control chip of the controller for performing voltage stabilization processing on the input voltage of the Bluetooth control chip.

\* \* \* \* \*